(12) United States Patent
Höfig et al.

(10) Patent No.: US 11,196,564 B2
(45) Date of Patent: Dec. 7, 2021

(54) HIERARCHICAL DISTRIBUTED LEDGER

(71) Applicant: Siemens Aktiengesellschaft, Munich (DE)

(72) Inventors: Kai Höfig, Munich (DE); Cornel Klein, Oberhaching (DE); Martin Rothfelder, Munich (DE); Monika Sturm, Vienna (AT); Vladimir Zahorcak, Borinka (SK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/254,126

(22) PCT Filed: Jun. 14, 2019

(86) PCT No.: PCT/EP2019/065746
§ 371 (c)(1),
(2) Date: Dec. 18, 2020

(87) PCT Pub. No.: WO2019/243201
PCT Pub. Date: Dec. 26, 2019

(65) Prior Publication Data
US 2021/0263504 A1    Aug. 26, 2021

(30) Foreign Application Priority Data
Jun. 19, 2018  (EP) .................................. 18178535

(51) Int. Cl.
*H04L 9/32*      (2006.01)
*G06F 21/64*    (2013.01)
*G05B 19/418*   (2006.01)

(52) U.S. Cl.
CPC ...... *H04L 9/3239* (2013.01); *G05B 19/41835* (2013.01); *G06F 21/64* (2013.01); *H04L 2209/38* (2013.01)

(58) Field of Classification Search
CPC .... H04L 9/3239; H04L 2209/38; G06F 21/64
See application file for complete search history.

(56) References Cited

U.S. PATENT DOCUMENTS

| | | | |
|---|---|---|---|
| 8,300,811 B2 | 10/2012 | Georgiades et al. |
| 8,531,247 B2 | 9/2013 | Dichtl |
| 8,843,761 B2 | 9/2014 | Meyer et al. |
| 8,892,616 B2 | 11/2014 | Dichtl |
| 9,147,088 B2 | 9/2015 | Falk et al. |
| 9,584,311 B2 | 2/2017 | Meyer et al. |

(Continued)

FOREIGN PATENT DOCUMENTS

| | | |
|---|---|---|
| CN | 107147735 A | 9/2017 |
| CN | 107169144 A | 9/2017 |

(Continued)

OTHER PUBLICATIONS

Decision to Grant in corresponding European Patent Application No. 18178535.3 dated May 14, 2020. 2 pages.

(Continued)

*Primary Examiner* — Michael R Vaughan
(74) *Attorney, Agent, or Firm* — Schmeiser, Olsen & Watts LLP

(57) ABSTRACT

A monitoring production of a technical apparatus in a secure and reliable manner is provided. This monitoring is achieved using encapsulation of a first distributed ledger into a second distributed ledger.

10 Claims, 4 Drawing Sheets

(56) References Cited

U.S. PATENT DOCUMENTS

| | | |
|---|---|---|
| 9,641,515 B2 | 5/2017 | Dichtl et al. |
| 9,674,216 B2 | 6/2017 | Buβer et al. |
| 10,157,248 B2 | 12/2018 | Boffgen et al. |
| 2010/0146624 A1 | 6/2010 | Bernd et al. |
| 2013/0156180 A1 | 6/2013 | Erwin |
| 2015/0264080 A1 | 9/2015 | Jens-Uwe et al. |
| 2016/0253438 A1 | 9/2016 | Pascale et al. |
| 2017/0046694 A1 | 2/2017 | Carroll et al. |
| 2018/0101842 A1 | 4/2018 | Ventura et al. |
| 2019/0079950 A1* | 3/2019 | Ramabaja ............ G06F 16/1805 |
| 2019/0227515 A1 | 7/2019 | Nikolai et al. |
| 2019/0363890 A1* | 11/2019 | Johnson ................ H04L 9/3297 |
| 2020/0167773 A1* | 5/2020 | Cervenka ................ G06F 16/27 |
| 2020/0169413 A1 | 5/2020 | Hans et al. |
| 2020/0201681 A1* | 6/2020 | Thompson .......... G06F 9/45558 |
| 2020/0380475 A1* | 12/2020 | Krueger .............. G06F 21/6245 |

FOREIGN PATENT DOCUMENTS

| | | |
|---|---|---|
| CN | 107480990 A | 12/2017 |
| DE | 102016118612 A1 | 4/2018 |
| EP | 2870565 A1 | 5/2015 |
| EP | 2891102 A1 | 7/2015 |
| EP | 2605445 B1 | 9/2015 |
| EP | 2976707 B1 | 1/2016 |
| EP | 3028140 A1 | 6/2016 |
| EP | 2870565 B1 | 9/2017 |
| EP | 3413530 A1 | 12/2018 |
| WO | 2017137256 A1 | 8/2017 |

OTHER PUBLICATIONS

International Search Report and Written Opinion in corresponding to PCT Patent Application No. PCT/EP2019/065746 dated Sep. 4, 2019. 13 pages.

Examination Report in European Patent Application No. 18178535.3 dated Feb. 4, 2019. 4 pages.

Extended European Search Report in corresponding European Patent Application No. 18178535.3 dated Nov. 27, 2018. 7 pages.

Notification to Grant Patent in related Chinese Patent Application No. 201980041261.9 dated Sep. 24, 2021. 6 pages.

* cited by examiner

HIERARCHICAL DISTRIBUTED LEDGER

CROSS-REFERENCE TO RELATED APPLICATIONS

This application claims priority to PCT Application No. PCT/EP2019/065746, having a filing date of Jun. 14, 2019, which is based off of European Patent Application No. 18178535.3, having a filing date of Jun. 19, 2018, the entire contents both of which are hereby incorporated by reference.

FIELD OF TECHNOLOGY

Various examples of the present invention generally relate to monitoring production of a technical apparatus including multiple components. Various examples specifically relate to monitoring based on a distributed ledger.

BACKGROUND

In industrial environments, product properties of technical apparatuses are often closely monitored. Specifically, the production of technical apparatuses is closely monitored, e.g., for reasons of quality assurance.

Conventional techniques of monitoring production of technical apparatuses, e.g., in a production log, face certain restrictions and drawbacks. For example, conventional production logs can be subject to falsification or forgery.

The following documents are known from the prior art: U.S. Pat. No. 8,531,247 B2, U.S. Pat. No. 8,892,616 B2, U.S. Pat. No. 8,300,811 B2, U.S. Pat. No. 9,147,088 B2, U.S. Pat. No. 9,584,311 B2, EP 2976707 B1, EP 2605 445 B1, EP 2870565 A1, EP 2891102 A1, WO 2017137256 A1, EP 2870565 B1, EP 3028140 B1, EP 17175275 and U.S. Pat. No. 8,843,761 B.

SUMMARY

Therefore, a need exists for advanced techniques of monitoring production of technical apparatuses. Specifically, a need exists for advanced techniques which provide for security against falsification and forgery.

A device for monitoring production of a technical apparatus is provided. The technical apparatus includes a plurality of components. The device includes a control circuitry configured to, for each one of a plurality of production steps of a first component of the plurality of components, trigger deposition of a respective entry in a first distributed ledger associated with the first component, the respective entry being associated with the respective production step. The control circuitry is further configured to, upon integration of the first component in a second component of the plurality of components: trigger encapsulation of the first distributed ledger in a second distributed ledger associated with the second component.

A method of monitoring production of a technical apparatus including a plurality of components is provided. The method includes, for each one of a plurality of production steps of a first component of the plurality of components, triggering deposition of a respective entry in a first distributed ledger associated with the first component, the respective entry being associated with the respective production step. The method also includes, upon integration of the first component in a second component of the plurality of components: triggering encapsulation of the first distributed ledger in a second distributed ledger associated with the second component.

A computer program product or computer program includes program code. The program code can be executed by at least one processor. Executing the program code causes the at least one processor to perform a method of monitoring production of a technical apparatus which includes a plurality of components. The method includes, for each one of a plurality of production steps of a first component of the plurality of components, triggering deposition of a respective entry in a first distributed ledger associated with the first component, the respective entry being associated with the respective production step. The method also includes, upon integration of the first component in a second component of the plurality of components: triggering encapsulation of the first distributed ledger in a second distributed ledger associated with the second component.

It is to be understood that the features mentioned above and those yet to be explained below may be used not only in the respective combinations indicated, but also in other combinations or in isolation without departing from the scope of the present invention.

BRIEF DESCRIPTION

Some of the embodiments will be described in detail, with reference to the following figures, wherein like designations denote like members, wherein.

DETAILED DESCRIPTION

Figure 1:
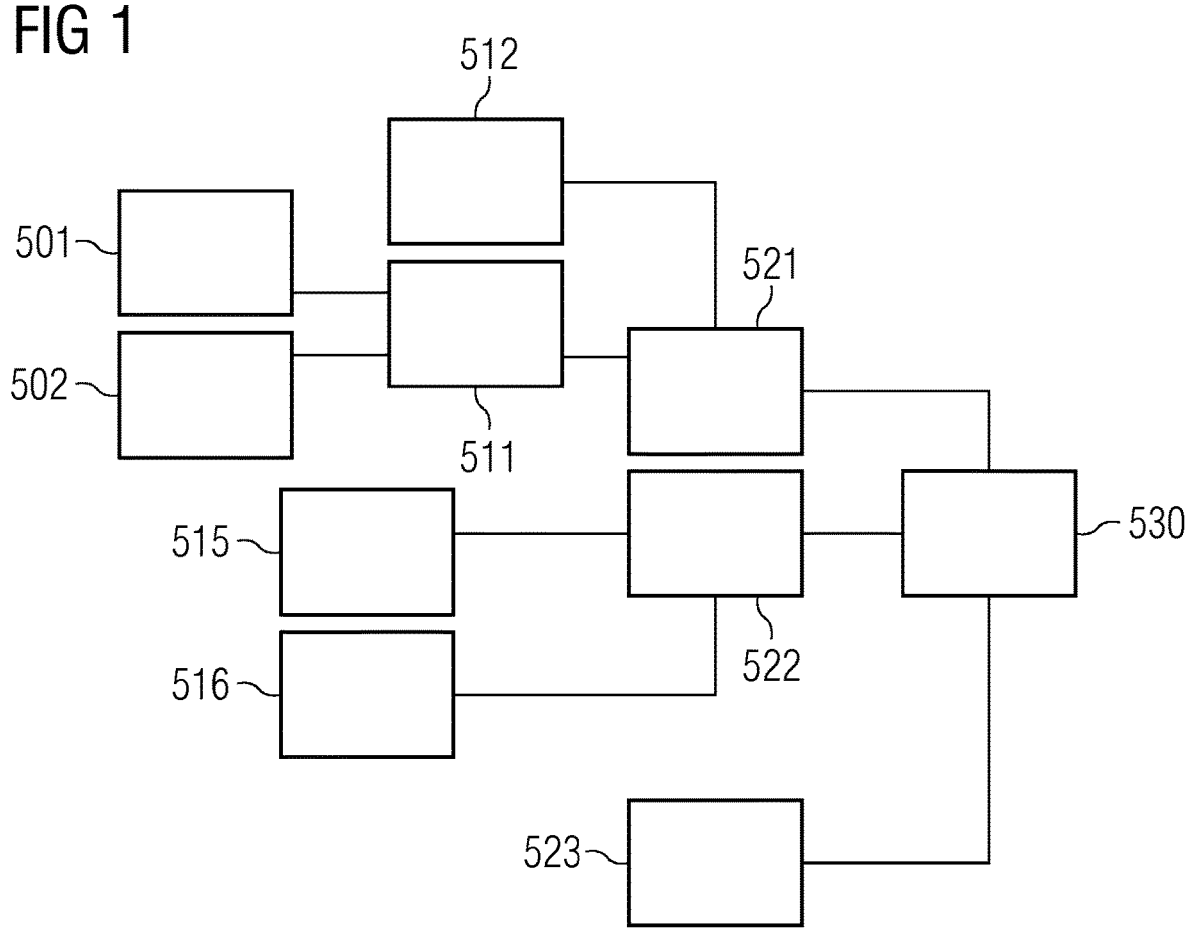
FIG. 1 depicts a technical apparatus including multiple components and further schematically illustrates production of the technical apparatus according to various examples.

In the following, embodiments of the present invention will be described in detail with reference to the accompanying drawings. It is to be understood that the following description of embodiments is not to be taken in a limiting sense. The scope of the present invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are described which facilitate secure and flexible monitoring of production of technical apparatuses. Examples of technical apparatuses include complex technical systems that are produced from multiple components. Specifically, examples include complex technical systems that are produced in multiple production steps, i.e., that include tier 1 components, tier 2 components, tier 3 components, and so on. In other words, a hierarchical production process can be monitored according to various examples.

As a general rule, the techniques described herein are not limited to a particular type of technical apparatuses. Examples include, but are not limited to: trains, vehicles, engines, turbines, power plants, computers, control equipment, robots, assembly lines, etc.

Techniques are described which enable employing a distributed ledger technology to monitor the production of technical apparatuses. A distributed ledger is a distributed database that facilitates replicating and sharing and synchronizing of data across multiple sites, geographically distanced. Typically, the distributed ledger does not rely on a centralized authority administrating the distribution of the data across the multiple sites. The distributed ledger can operate on a common algorithm that organizes the distribution of the data across the multiple sites. The algorithm can provide for security against falsification and forgery of transactions recorded in the distributed ledger.

An example of a distributed ledger is the Blockchain. Hereinafter, various techniques will be primarily described with respect to an implementation using the Blockchain, for sake of simplicity. However, similar techniques may be readily applied to other kinds and types of distributed ledgers.

A Blockchain is a replicated distributed ledger that verifies and stores transactions occurring in a peer-to-peer network. A Blockchain does not rely on the operations of any central trusted authority. Instead, its trustworthiness is derived from the Blockchain algorithm and optionally an incentive mechanisms for processing nodes in the network. Blockchains provide a decentralized protected mechanism of storing transactions. Examples of transactions include digital currency, smart contracts, and data in an internet of things application. The Blockchain protects its entries in the respective distributed database (blocks) and the corresponding log of transactions against manipulations by using cryptography. A block carries a set of transactions. Each block points to its previous block using an encrypted key. Because of this, manipulation a block by changing the information is not possible or only possible to a limited degree.

Various techniques are based on the finding that in industrial environments product properties or data from the production process, e.g., temperature, shock, etc. often need to be logged. Various techniques are based on the finding that such a log can be implemented using a Blockchain. Here, the need for data integrity can be satisfied, even in view of multiple stakeholders that are typically involved: Each step of the value chain from the conveyance of raw material over processing to the construction of complex apparatuses can be stored in a Blockchain so that any stakeholder gains knowledge about the upstream activities of the production. The Blockchain is additionally protected against manipulations. This is an important functionality, since manipulating quality data could potentially create monetary benefits for some stakeholders. Quality assurance becomes possible.

Various techniques are based on the finding that since technical apparatuses are typically produced in an hierarchical manner, the techniques used to monitor the production need to be able to adequately cover this hierarchy, by storing the relevant data of physical technical parameters of the production steps. An example of a technical apparatus being manufactured using such a hierarchy is a computer. A computer consists of different components (tier 1), each component in turn built from subcomponents (tier 2). An example for such a hierarchical decomposition of a system is depicted in FIG. 1.

FIG. 1 schematically illustrates aspects with respect to the technical apparatus 530. The technical apparatus 530 includes multiple components 501-523. Specifically, the technical apparatus 530 includes components of multiple hierarchies: tier 1 components 521-523 at the highest level of hierarchy; tier 2 components 511-516 at the next lower level of hierarchy; and tier 3 components 501, 502 at the lowest level of hierarchy. For example, the tier 3 components 501, 502 are, during production of the apparatus 530, integrated into the tier 2 component 511 which, in turn is integrated into the tier 1 component 521, together with the further tier 2 component 512. The tier 1 component 521 is then integrated together with the further tier 1 components 522, 523, to form the system 530.

As a general rule, production of each component 501-523 may include one or more production steps. For example, to produce the component 511, a count of two, three, or more production steps may be required (the production steps are not illustrated in FIG. 1).

For example, let component 511 of FIG. 1 be a graphics card to be integrated into a computer 530. Then, the quality properties of the computer 530 will vary depending on the kind and type of graphics card. According to the techniques described herein, it is possible to provide a falsification-proof log of the production of the computer, including indication of the kind and type of the graphics card.

As a general rule, it is possible to monitor different properties of the production of the apparatus 530 according to the various examples described herein. As will be appreciated from FIG. 1, the technical apparatus 530 is characterized by (i) the number and type of production steps involved in the production of the apparatus 530; (ii) the number and type of components 501-523 from which it is produced; and (iii) physical-technical parameters of the respective production steps associated with the components 501-523. According to the various examples described herein, it is possible to monitor, using the Blockchain, (i) and/or (ii) and/or (iii). Thus, as will be appreciated, different levels of detail of the monitoring can be implemented in the examples described herein.

In the various examples described herein, various physical-technical parameters of a production step can be monitored. Examples include: an error log of an associated production equipment; a duration required to perform the production step; an environmental parameter at the production site, e.g., temperature, pressure, humidity, shock, etc.; an operational parameter of the production equipment; etc.

Figure 2:
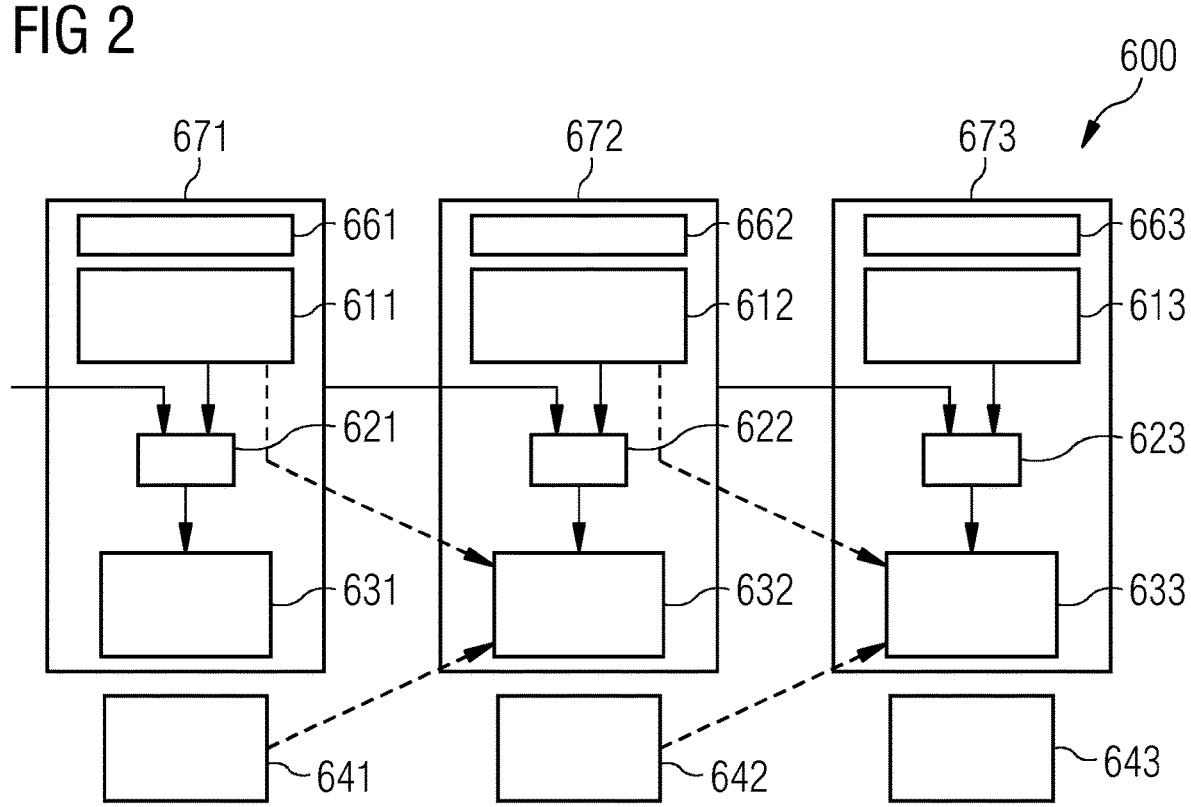
FIG. 2 depicts a Blockchain implementing a distributed ledger according to various examples.

Various techniques are based on the finding that, if the production is monitored using a Blockchain and if a tier n−1 is integrated into a tier n component, this hierarchical step of integration may also be applied to the data stored in the Blockchain. FIG. 2 illustrates details of the Blockchain.

FIG. 2 illustrates aspects with respect to the Blockchain, specifically the algorithm to generate the Blockchain 600. In the example of FIG. 2, the Blockchain 600 includes multiple blocks 671-673—which implement the entries of the distributed ledger.

Each block 671-673 points to the previous block 671-673 of the Blockchain 600, e.g., by means of cryptographic hash values 621-623 (chaining). For example, the block 672 points to the block 671 in that the hash value 622 of the block 672 is generated based on the block 671. A hash value corresponds to the digital signature of each block 671-673. It is computationally easy to generate a hash value from a block, but it is hard to generate a block from a hash value. Thereby, it is easy to check if the hash value provided for a block is valid, e.g., by simply generating again and comparing it with the hash value included in the block.

Each block 671-673 includes a header 611-613 that may include a summary of one or more respective transactions 661-663, e.g., Merkle trees thereof. For example, each block 671-673 can include a list of transactions 661-663. Generally, the transactions 661-663 can correspond to data to be logged. Each transaction 661-663 is typically signed by the owner of the transaction. The signature 631-633 becomes part of the block 671-673; and, thus, also becomes part of the hash value 621-623 of the next block 671-673. Based on private keys 641-643 and a respective signature algorithm using the transaction 661-663—or more specifically, the hash value 621-623 computed based on the transaction 661-663—as an input, the signatures 631-633 are generated. The signatures 631-663 can be verified based on the public key of the respective owner.

To trigger deposition of a block 671-673, the respective block is required to be given a valid hash value 621-623. To calculate the hash value 621-623, a timestamp and a random value can be taken into account. A difficulty can be set. The process of adding a block 671-673 is sometimes called mining. Deposition is triggered by requesting participating nodes to do the mining.

Using this algorithm, it is computationally expensive task to change data in an existing block 671-673. Changing data in a block, for example the transaction 661-663, would change its hash and would invalidate the Blockchain since the block after the manipulated block would have an invalid hash for the previous block.

Generating a block in a way so that it has the same hash as an existing block is theoretically possible, since the number of hashes is finite and the number of blocks is infinite, but this is mathematical hard.

A Blockchain has different applications and can be generally used as a distributed database. It can be used with smart contracts that allow programmable business logic or conditional transactions. Smart contracts are semi-autonomous programs running on the Blockchain. They can store and update variables, and instantiate and invoke other smart contracts. Ethereum is the most widely used Blockchain that supports a Turing-complete scripting language (Solidity) for smart contracts. Trust in the valid execution of the code arises from trust in the integrity of the Blockchain.

As will be appreciated from FIG. 2, the structure of the Blockchain 600 is linear. A sequence of chained blocks 671-673 is included in the Blockchain 600. Various techniques are based on the finding that such a linear structure of the Blockchain 600, when taken in isolation, is not well suited for monitoring the production process of the complex technical apparatus 530 including a hierarchy of components 501-523.

To address this, according to various examples, the concept of encapsulation is employed for Blockchains. For example, for each one of the plurality of production steps of a first component 501-523, chaining of a respective block associated with the respective production step in a first Blockchain is triggered. The first Blockchain is associated with the first component. As such, the first Blockchain may include multiple blocks that include transactions indicative of physical-technical parameters of the various production steps of the first component.

Then, eventually production of the first component is finished. The first component is then integrated into another, second component. Upon integration of the first component into the second component, encapsulation of the first Blockchain in a second Blockchain which is associated with the second component is triggered. The second Blockchain, in turn, may include multiple blocks that include the transactions indicative of the physical-technical parameters production steps of the second component.

In general terms, this concept can be readily applied to distributed ledger technologies. Here, deposition of entries in a first distributed ledger associated with the first component is triggered, wherein the entries are associated with respective production steps of the first component. Then, upon integration of the first component in a second component, encapsulation of the first distributed ledger in a second distributed ledger associated with the second component is triggered.

Let $B=b_1, \ldots, b_n$ be a Blockchain B with blocks $B_i$ of a component $C_B$. If production data from a production step is stored in a block $b_i \in B$ of the Blockchain, Block Bi can be termed a production block. If during any production step an existing component $C_A$ is integrated into the component $C_B$, the process of integration is logged using a production block of B. Before the integration process is started, the existing Blockchain A of component $C_A$ is stored into the Blockchain B using a so called integration block (this corresponds to an encapsulation). So with some production steps logged in the blocks $b_m, \ldots, b_n$ before the integration of component $C_A$ into component $C_B$ and some further production steps logged in the blocks $b_s, \ldots, b_t$, the Blockchain B is:

$$B=b_m, \ldots, b_n, b_{integration}, b_s, \ldots, b_t$$

with $b_{integration}$ storing the existing Blockchain A containing the production log for component $C_A$. Hence, the various blocks of the Blockchain A can be aggregated into a single block of the Blockchain B. Here, the block $b_{integration}$ is deposited in the Blockchain B and is associated with the production step of integration of component $C_A$ in component $C_B$.

By this concept of encapsulation, the hierarchical composition of technical apparatuses during a production process can be monitored. In this way, existing Blockchain algorithms can be used to check the integrity.

An example integrity check operating on encapsulated Blockchains is illustrated by the pseudo-code in Table I.

TABLE I

| | |
|---|---|
| (1) | bool hierarchical_check (Blockchain B) |
| (2) | { |
| (3) |   bool integrity=true; |
| (4) |   foreach (Block b in B) |
| (5) |   { |
| (6) |     if (check(b)!=true) |
| (7) |     { |
| (8) |       integrity=false; |
| (9) |       break; |
| (10) |     } |
| (11) |     if (b is integration block) |
| (12) |     { |
| (13) |       if (hierarchical_check(b)!=true) |
| (14) |       { |
| (15) |         integrity=false; |
| (16) |         break; |
| (17) |       } |
| (18) |     } |
| (19) |   } |
| (20) |   return integrity; |
| (21) | } |

As will be appreciated from table I, the integrity check initially operates on the Blockchain B—which is higher in hierarchy than the Blockchain A—, see line 4 of the pseudo code. Then, the integrity check is recursively invoked for Blockchain B—which is lower in hierarchy—, see line 13 of the pseudocode. Hence, the integrity check is recursively applied, stepping down in hierarchy along the encapsulated Blockchains.

Using the hierarchical encapsulation of Blockchains and checking the data integrity using the algorithm as presented in Table I, hierarchically decomposed system properties can be stored in a Blockchain. This is also illustrated in FIG. 3.

Figure 3:
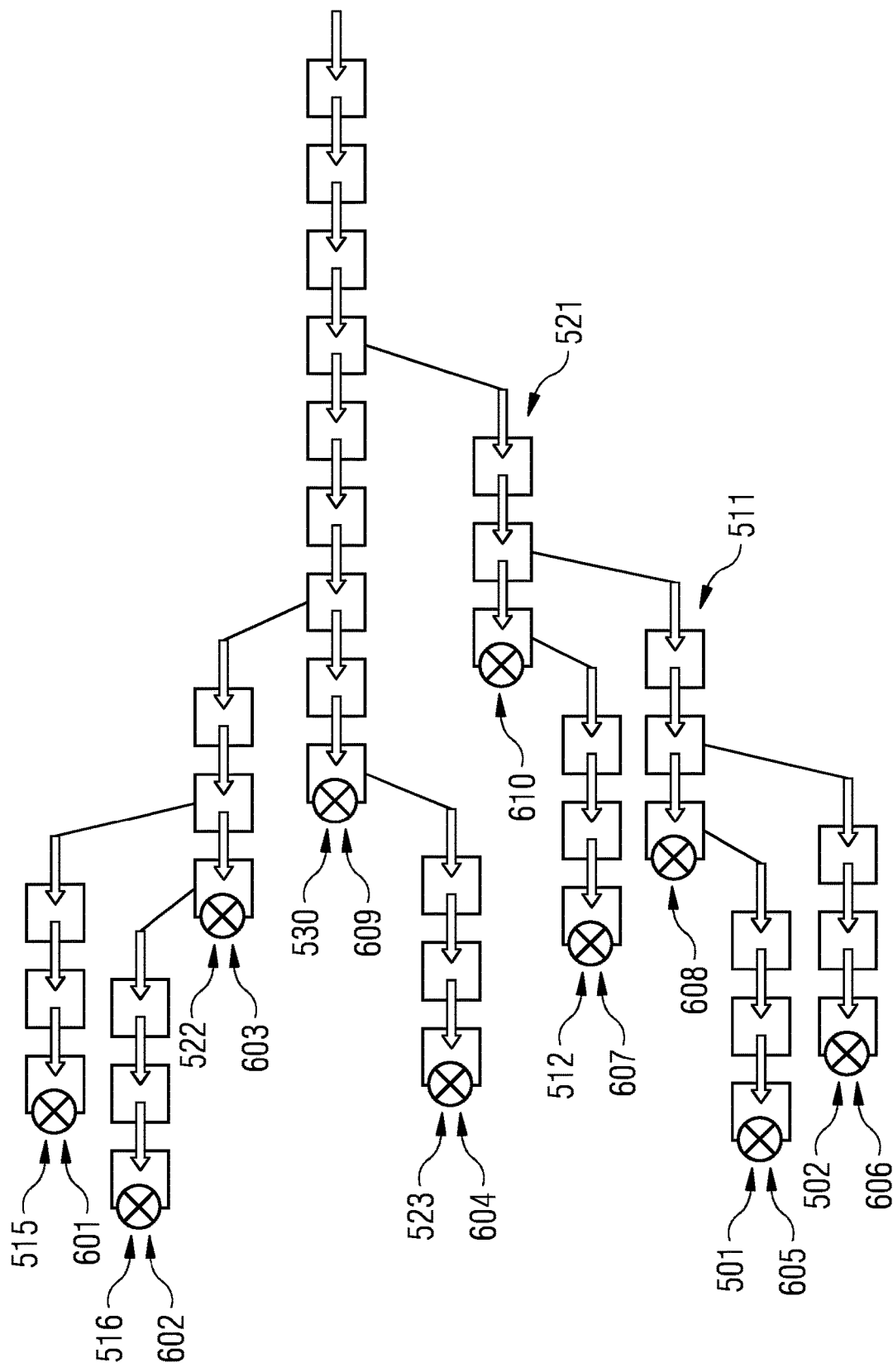
FIG. 3 depicts encapsulation of Blockchains according to various examples.

FIG. 3 illustrates an example for a Blockchain 609 that stores data for the decomposition of a system depicted in FIG. 1. As illustrated, there are different integration steps. Component 522, for example, is produced by integrating the components 515 and 516 and then carrying out one additional production step. In this way, the Blockchain 609 is decomposed in the same way as the apparatus 530. The transactions contained in the Blockchain 609 reflects the stored data for the components 511-523 and the integrity of the data is ensured by Blockchain technology.

In FIG. 3, the root or genesis blocks of each Blockchain 601-609 are marked using asterisks. These genesis blocks do not have a predecessor and, thus, do not incorporate the hash values of any further block of the respective Blockchain 601-609. Each Blockchain 601-609 has a corresponding genesis block.

As a general rule, the various Blockchains encapsulated within each other can share the same algorithm, e.g., the algorithm as explained in connection with FIG. 2. For example, the same hashing algorithm can be employed, which facilitates the recursive integrity check according to Table I.

Figure 4:
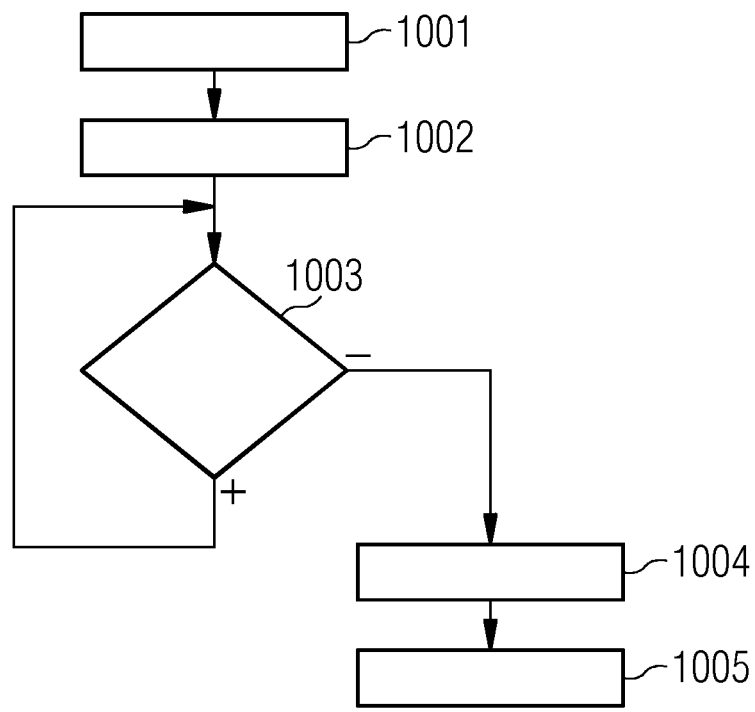
FIG. 4 depicts a flowchart of a method according to various examples.

FIG. 4 is a flowchart of a method according to various examples.

The method starts at box 1001.

Next, at box 1002, deposition of a genesis entry in a respective distributed ledger is triggered. This entry may be indicative of one or more physical-technical parameters of a production step of a given component; or indicative of the type of the production step of the given component.

Next, at box 1003, it is checked whether a further production step of the given component occurs. In the affirmative, box 1002 is re-executed, i.e., deposition of a further entry in the distributed ledger is triggered. Since re-execution of box 1002 is not the first iteration of box 1002, this further entry of the distributed ledger is not the genesis entry. As such, the current iteration of box 1002 depends on the previous iteration of box 1002, e.g., by incorporating a corresponding hash value of the previously deposited entry in the current entry to be deposited or applying another deposition algorithm.

As a general rule, triggering deposition of an entry in the distributed ledger can include decentralized processing. Specifically, it would be possible that a corresponding transaction of the entry to be deposited in the distributed ledger is authenticated by mass collaboration of multiple nodes participating in the distributed ledger. Accordingly, the corresponding transactions or control data indicative of the corresponding transactions can be communicated to one or more nodes participating in the distributed ledger. Here, the signatures of the transactions can be verified.

Depositing an entry in a distributed ledger can be implemented by chaining a block in a Blockchain.

When executing an iteration of box 1002, two scenarios are conceivable.

In a first scenario, the associated production step does not involve incorporating one or more subcomponents into the given component; rather, the associated production step can correspond to manipulation or testing of the given component. Examples would include a backend test of a chip where the chip itself is not modified, or etching of a die, etc.

In a second scenario, the associated production step involves incorporating one or more subcomponents into the given component. Then, a corresponding entry of the distributed ledger may be indicative of a transaction that aggregates one or more distributed ledgers associated with the one or more subcomponents. This corresponds to encapsulating the one or more distributed ledgers associated with the one or more subcomponents into the distributed ledger that is associated with the given component. Examples of such a production step include attaching a die on a chip carrier, integrating a graphics card into a computer, etc.

As a general rule, encapsulation of a first distributed ledger into a second distributed ledger can be implemented using the same depositing algorithm also applied for depositing conventional transactions into the second distributed ledger. An example of such a depositing algorithm has been described above with respect to FIG. 2; here, the hash value of a previous entry is included in a subsequent entry and control data indicative of the respective transactions is included in a header of each entry.

If, after one or more iterations of box 1002, it is judged at box 1003 that a further production step does not occur, then, box 1004 is executed. At box 1004 encapsulation of the distributed ledger including one or more entries associated with the one or more iterations of box 1002 in a further distributed ledger of higher hierarchy is triggered. Box 1004 is optional.

The method ends at box 1005.

Figure 5:
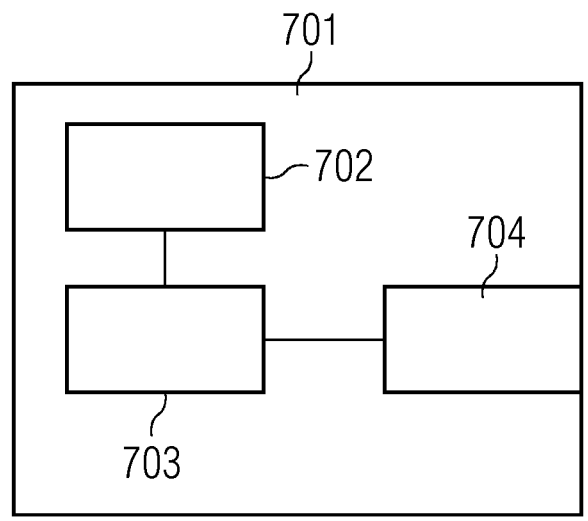
FIG. 5 depicts a device according to various examples.

FIG. 5 schematically illustrates aspects with respect to a device 701. The device includes control circuitry including a memory 702 and a processor 703. The processor 703 can load program code from the memory 702. Upon executing the program code, the processor 703 can implement techniques as described herein with respect to monitoring production of a technical apparatus using a distributed ledger such as a Blockchain, specifically using a hierarchy of distributed ledgers. Specifically, the processor 703 can implement techniques that rely on encapsulating a lower-hierarchy distributed ledger into a higher-hierarchy distributed ledger.

The device 701 also includes an interface 704. The processor 703 can trigger deposition of entries into the distributed ledger by communicating the control signals via the interface 704. For example, transactions can be provided to one or more nodes participating in the distributed ledger, for verification. Then, a corresponding entry can be added to the distributed ledger upon verification.

Summarizing, techniques have been described to provide a Blockchain which includes blocks that include sub-Blockchains in a hierarchy. This hierarchy corresponds to a hierarchy of production of the associated technical apparatus from multiple components. A higher-level hierarchy Blockchain encapsulates one or more lower-level hierarchy Blockchains.

Although the embodiment of the present invention has been shown and described with respect to certain embodiments, equivalents and modifications will occur to others skilled in the art upon the reading and understanding of the specification. The present invention includes all such equivalents and modifications.

For illustration, above, various examples have been described that rely on a Blockchain to monitor production of a technical apparatus. Similar techniques may be readily applied to other kinds and types of distributed ledgers.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A device for monitoring production of a technical apparatus comprising a plurality of components, the device comprising a control circuitry configured to:
   for each one of a plurality of production steps of a first component of the plurality of components: trigger deposition of a respective entry in a first distributed ledger associated with the first component, the respective entry being associated with the respective production step; and
   upon integration of the first component in a second component of the plurality of components: trigger encapsulation of the first distributed ledger in a second distributed ledger associated with the second component;
   wherein the first distributed ledger is a first blockchain comprising multiple first blocks;
   wherein the second distributed ledger is a second blockchain comprising multiple second blocks.

2. The device according to claim 1, wherein the triggering of the encapsulation of the first distributed ledger in the second distributed ledger comprises:
   triggering deposition of a respective entry in the second distributed ledger which is associated with the respective production step of the integration of the first component in the second component.

3. The device according to claim 1, wherein entries in the first distributed ledger are indicative of a physical-technical parameter of the production steps.

4. The device according to claim 3, wherein the physical-technical parameter is selected from the group comprising: an error log; a duration; an environmental parameter; and an operational parameter of production equipment.

5. The device according to claim 1, wherein the control circuitry is further configured to perform a recursive integrity check, wherein the recursive integrity check operates on the second distributed ledger prior to operating on the first distributed ledger.

6. A method of monitoring production of a technical apparatus comprising a plurality of components, the method comprising:
   for each one of a plurality of production steps of a first component of the plurality of components: triggering deposition of a respective entry in a first distributed ledger associated with the first component, the respective entry being associated with the respective production step; and
   upon integration of the first component in a second component of the plurality of components: triggering encapsulation of the first distributed ledger in a second distributed ledger associated with the second component;
   wherein the first distributed ledger is a first blockchain comprising multiple first blocks;
   wherein the second distributed ledger is a second blockchain comprising multiple second blocks.

7. The method according to claim 6, wherein the triggering of the encapsulation of the first distributed ledger in the second distributed ledger comprises:
   triggering deposition of a respective entry in the second distributed ledger which is associated with the respective production step of the integration of the first component in the second component.

8. The method according to claim 6, wherein entries in the first distributed ledger are indicative of a physical-technical parameter of the production step.

9. The method according to claim 8, wherein the physical-technical parameter is selected from the group comprising: an error log; a duration; an environmental parameter; and an operational parameter of production equipment.

10. The method of according to claim 6, further comprising:
    performing a recursive integrity check, wherein the recursive integrity check operates on the second distributed ledger prior to operating on the first distributed ledger.

* * * * *